United States Patent [19]
Yamamoto et al.

[11] Patent Number: 5,244,992
[45] Date of Patent: Sep. 14, 1993

[54] POLY(ISO)QUINOLINEDIYLS AND PREPARATION AND USE THEREOF

[75] Inventors: Takakazu Yamamoto; Takaki Kanbara, both of Yokohama, Japan

[73] Assignee: Tokyo Institute of Technology, Tokyo, Japan

[21] Appl. No.: 16,320

[22] Filed: Feb. 11, 1993

Related U.S. Application Data

[62] Division of Ser. No. 848,193, Mar. 10, 1992.

[30] Foreign Application Priority Data

Sep. 13, 1991 [JP] Japan .................. 3-234809

[51] Int. Cl.$^5$ .................. C08F 4/80; C08F 126/06
[52] U.S. Cl. .................. 526/171; 526/259
[58] Field of Search .................. 526/171

[56] References Cited

U.S. PATENT DOCUMENTS

| | | | |
|---|---|---|---|
| 4,727,135 | 2/1988 | Chiang et al. | 528/423 |
| 5,151,478 | 9/1992 | Chiang et al. | 526/258 |
| 5,171,478 | 9/1992 | Chiang et al. | 526/258 |

FOREIGN PATENT DOCUMENTS 1-210420 8/1989 Japan .

OTHER PUBLICATIONS

Tunney et al., "Conducting Polyquinolines", Macromolecules (1987), 20 pp. 258-264.
Chiang et al., "Chemistry of Catalytic Dehydrogenative Oligomerization of Tetrahydroquinoline and Structural Characterization of Nonsubstituted Quinoline Oligomers", J. Am. Chem. Soc. (1991), 113 pp. 6574-6584.
Agrawal et al., "Thin-Film Processing and Optical Properties of Conjugated Rigid-Rod Polyquinolines for Nonlinear Optical Applications", Chem. Mater. (1992), 2 pp. 95-104.
Yamamoto, "New Polyenes and Their Utilization", High Molecules, vol. 34, No. 10, pp. 848-851 (1985).
Yamamoto, Denki Kagaku "2. Advancing Polymer Batteries—Aiming at Light-Weight Storage Batteries", vol. 54, No. 1, (1986), pp. 306-311.
Takaki Kanbara et al., "Preparation and Properties of Poly(quinolinediyl)s and Poly(isoquinolinel, 4-diyl) with New . . . ", Macromolecules (1991), vol. 24, pp. 5883-5885.
S. E. Tunney et al., "Conducting Polyquinolines", Macromolecules (1983), vol. 16, pp. 1398-1999.
J. K. Stille, "Polyquinoline", Macromolecules (1981), vol. 14, pp. 870-880.

*Primary Examiner*—Joseph L. Schofer
*Assistant Examiner*—Wu C. Cheng
*Attorney, Agent, or Firm*—Spencer, Frank & Schneider

[57] ABSTRACT

An (iso)quinolinediyl polymer having a degree of polymerization of at least 5 is produced from an (iso)quinoline dihalide by a reaction with a zero-valent nickel compound, or an electrolytic reduction in the presence of a nickel compound. Since it is excellent in heat-resistivity and soluble in organic solvents, this polymer can be shaped by a dry-process into fibers, films or the like. Its depolarization degree and electrochemical oxidation-reduction potential can be controlled according to its structure.

2 Claims, 1 Drawing Sheet

FIG_1
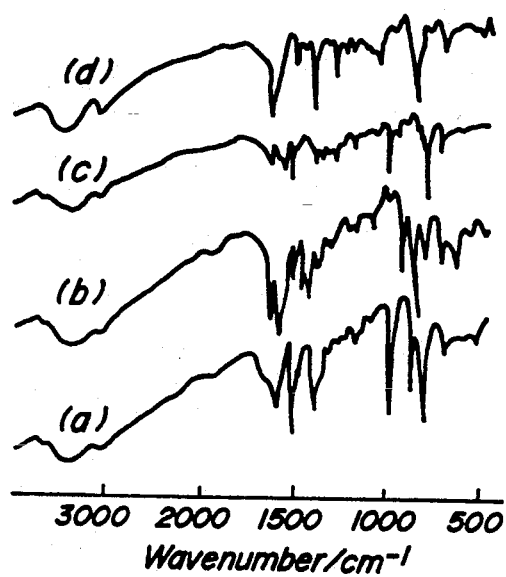
FIG_2
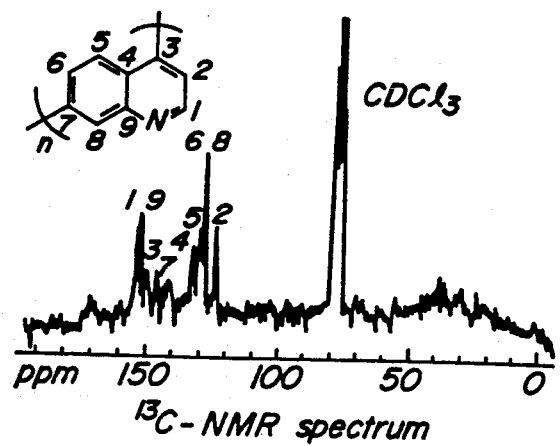
$^{13}$C-NMR spectrum

POLY(ISO)QUINOLINEDIYLS AND PREPARATION AND USE THEREOF

This is a division of application Ser. No. 07/848,193 filed Mar. 10, 1992, pending.

BACKGROUND OF THE INVENTION

1. Field of the Invention

The present invention relates to polyquinolinediyls or polyisoquinolinediyls [hereinafter collectively referred to as "(iso)quinolinediyl polymers"] soluble in organic solvents, and excellent in heat-resistivity and electrochemical activity, comprising, as a recurring structural unit, a divalent residue of a condensed heterocyclic compound, quinoline or isoquinoline [hereinafter collectively referred to as "(iso)quinoline"], derived by eliminating two hydrogen atoms therefrom, and manufacturing processes and uses thereof.

2. Description of the Prior Art

Polyarylenes having a structure comprising continuous linkages of aromatic rings, such as poly-p-phenylene, poly-2,5-thienylene and poly-1,4-naphthylene, generally have an excellent heat-resistivity. Besides, it has been known that adducts of these polyarylenes with an electron acceptor such as $AsF_5$ or the like or an electron donor such as lithium, sodium or the like have an electroconductivity and properties utilizable as active materials for primary cells or secondary batteries [for example, "High Molecules", vol. 34, p. 848 (1985)]. Alternatively, there are proposed in Japanese Patent Application Laid-open No. 1-210,420 electroconductive materials produced by reducing a polymer comprising, as a recurring structural unit, a group comprising a 6-membered heterocyclic unit containing a $\pi$-conjugation system extending continuously along the polymer main chain, for example, 2,5-pyridinediyl group.

However, since most of the hitherto proposed polyarylenes have a low solubility in organic solvents and are infusible, their use is limited and, moreover, problems are posed in drawing out their characteristic functions. Further, it has been desired to develop novel polymers with physical properties the aforementioned conventional polyarylenes have never possessed, by modifying the molecular structures thereof. For example, if polyarylenes different in oxidation-reduction potential from the conventional polyarylenes can be obtained, polymer batteries differing in characteristics from the conventional batteries [for example, described in "Denki Kagaku" vol. 54, p. 306 (1986)] will be able to be provided by using these novel polyarylenes as a component of batteries such as an electrochemically active material or electrode material.

SUMMARY OF THE INVENTION

The present invention has been accomplished, under these circumstances, as a result of assiduous studies conducted aiming to find polyarylenes having a novel molecular structure.

An object of the present invention is to provide novel polyarylenes, particularly (iso)quinolinediyl polymers, having an excellent heat-resistivity, being soluble in organic solvents and having a controllable degree of depolarization and electrochemical oxidation-reduction potentials.

Another object of the present invention is to utilize such novel (iso)quinolinediyl polymers as shaped bodies such as fibers, films or the like; electrochromic elements; components for cells, such as active materials, electrodes or the like, of cells; n-type semiconductors; or the like.

The above objects can be achieved by (iso)quinolinediyl polymers comprising, as a recurring structural unit, a divalent group represented by the following chemical formula (1) or (2):

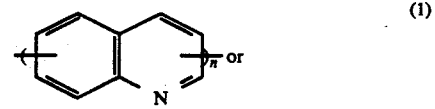

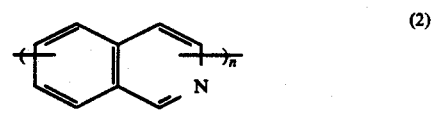

which is derived from a condensed heterocyclic compound, (iso)quinoline, by eliminating two hydrogen atoms at arbitrary positions thereof, and having a degree of polymerization (n) of at least 5. If the degree of polymerization (n) is less than 5, sufficient performances as a polymer will not be able to display. Further, the present inventors have so far confirmed actually through experiments the polymers of the present invention having a degree of polymerization (n) of as high as about 200, prepared according to the after-described electrolytically reducing polycondensation process, and excellent properties and usefulness thereof. However, preparation and usefulness of polymers having a degree of polymerization exceeding about 200 can be naturally expected from the technical point of view.

The above-described polymers can be prepared by reacting an (iso)quinoline dihalide represented by the following general formula (3) or (4):

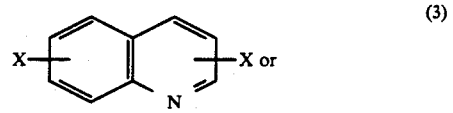

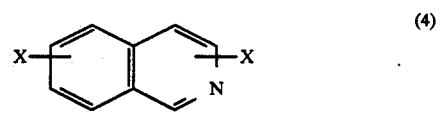

wherein X represents a halogen atom, with a zerovalent nickel compound. The above (iso)quinoline dihalides shown in the general formula (3) or (4) are derivatives of (iso)quinoline substituting two hydrogen atoms in arbitrary positions thereof with halogen atoms Alternatively, the above polymers also can be prepared by electrolytically reducing the (iso)quinoline dihalide compounds shown by the formula (3) or (4) in the presence of a nickel compound.

The novel (iso)quinolinediyl polymers according to the present invention can be applied to fibers, films, electrochromic elements or components of cells, such as active materials or electrodes of cells, by utilizing excellent characteristics thereof, and can be utilized as n-type semiconductors after reducing these polymers by means of a reducing agent or an electrochemical doping.

BRIEF DESCRIPTION OF THE DRAWINGS

The above and other objects, features and advantages of the present invention will become more apparent from reading the following description of the preferred embodiments taken in connection with the accompanying drawings, wherein:

FIG. 1 is a diagram showing IR spectra of the polymers according to the present invention; and FIG. 2 is a diagram showing a $^{13}$C-NMR spectrum of an embodiment of the polymer according to the present invention.

DETAILED DESCRIPTION OF THE INVENTION

In this specification, the term "polyarylene" is meant by a polymer comprising an aromatic ring as a recurring structural unit, such as poly-p-phenylene or poly-1,4-naphthylene, and the term "aromatic ring" is understood to include heterocyclic rings such as pyridine, thiophene or the like, in addition to aromatic hydrocarbon rings such as a benzene ring.

The (iso)quinolinediyl polymers according to the present invention can be obtained by reacting an (iso)-quinoline dihalide, for example, (iso)quinoline chloride or bromide, with an equimolar amount or excess of a zero-valent nickel compound added thereto in an organic solvent, followed by dehalogenation. A preferable reaction temperature ranges between room temperature and about 80° C. The reaction completes within about 24 hours. As the above organic solvent, for example, N,N-dimethylformamide, acetonitrile, toluene, tetrahydrofuran or the like can be employed.

The zero-valent nickel compound withdraws halogens from halogenated aromatic compounds and causes a coupling reaction between the aromatic groups [for example, "Synthesis", p. 736 (1984)]. This reaction is represented by the following equation (5):

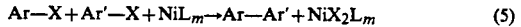

$$Ar-X+Ar'-X+NiL_m \rightarrow Ar-Ar'+NiX_2L_m \qquad (5)$$

wherein Ar and Ar' represent an aromatic group, X represents a halogen atom, L represents a neutral ligand and hence $NiL_m$ represents a zero-valent nickel compound.

Accordingly, if an aromatic compound having two halogens in the molecule, such as (iso)quinoline dihalide, is reacted with an equimolar or excess of a zero-valent nickel compound, the polymer of the present invention can be obtained by the dehalogenation polycondensation reaction shown in the following equations (6) and (7):

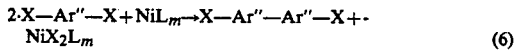

$$2 \cdot X-Ar''-X+NiL_m \rightarrow X-Ar''-Ar''-X + NiX_2L_m \qquad (6)$$

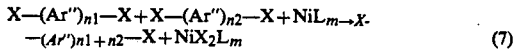

$$X-(Ar'')_{n1}-X+X-(Ar'')_{n2}-X+NiL_m \rightarrow X-(Ar'')_{n1+n2}-X+NiX_2L_m \qquad (7)$$

wherein X—Ar"—X represents an (iso)quinoline halide and X represents a halogen.

In the above-described reaction, as the zero-valent nickel compound, those synthesized in a reaction system, so to speak, in situ, immediately before conducting a polymerization reaction can be used directly. Alternatively, preliminarily synthesized and isolated ones also can be used. Such a zero-valent nickel compound is, for example, a nickel complex produced by a reduction reaction or a ligand interchange reaction in the presence of a neutral ligand. As a typical example of the neutral ligand, mention may be made of 1,5-cyclooctadiene, 2,2'-bipyridine, triphenylphosphine or the like.

Alternatively, the (iso)quinolinediyl polymers shown in the chemical formula (1) or (2) ca be obtained by another process wherein the (iso)quinoline dihalide shown in the above chemical formula (3) or (4) undergoes a dehalogenation reaction when it is subjected to an electrolytic reduction reaction in the presence of a divalent nickel compound. Namely, when a divalent nickel compound is electrolytically reduced in an electrolytic cell, a zero-valent nickel compound is produced by the reaction shown in the following chemical formula (8).

$$[Ni^{II}L_m]^{2+} + 2e \rightarrow Ni^0L_m \qquad (8)$$

Accordingly, when an aromatic compound having two halogens in the molecule, namely, an (iso)quinoline dihalide is electrolytically reduced in the presence of a divalent nickel compound, the polymer shown in the chemical formula (1) or (2) can be obtained according to the reaction shown in the chemical formula (8) and the reactions shown in the following formulae (9)–(11) consequently taking place, wherein the $Ni^0L_m$ producing in the reaction system is involved.

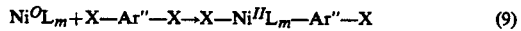

$$Ni^0L_m + X-Ar''-X \rightarrow X-Ni^{II}L_m-Ar''-X \qquad (9)$$

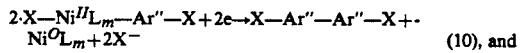

$$2 \cdot X-Ni^{II}L_m-Ar''-X + 2e \rightarrow X-Ar''-Ar''-X + Ni^0L_m + 2X^- \qquad (10), \text{ and}$$

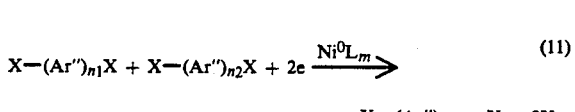

$$X-(Ar'')_{n1}X + X-(Ar'')_{n2}X + 2e \xrightarrow{Ni^0L_m} X-(Ar'')_{n1+n2}X + 2X^- \qquad (11)$$

wherein X—Ar"—X represents an (iso)quinoline dihalide, where X is a halogen.

The electrolysis may be conducted generally in the following conditions: namely, N,N-dimethylformamide or acetonitrile is used as a solvent, tetraethylammonium perchlorate or tetraethylammonium tetrafluoroborate as a supporting electrolytic salt is dissolved to prepare an electrolyte and a platinum electrode, ITO transparent electrode or graphite electrode is employed as an electrode. The (iso)quinoline dihalide and divalent nickel complex are dissolved in the electrolyte and the electrolytic reduction is conducted at a reduction potential of the divalent nickel complex, for example, at $-1.7V$ vs $Ag/Ag^+$ in the case of tris(2,2-bipyridine)-nickel salt.

The above nickel compounds which have been synthesized and isolated prior to the polymerization reaction can be used. Alternatively, those synthesized from nickel or a nickel compound in an electrolytic cell can be used directly as they are in the cell. As such a nickel compound, mention may be made of, for example, tris(2,2'-bipyridine)nickel dibromide [Ni(bpy)$_3$Br$_2$], dibromobis(triphenylphosphine)nickel [NiBr$_2$(PPh$_3$)$_2$] or the like.

The present invention will be explained more concretely and detailedly by way of example hereinafter.

EXAMPLE 1

A 44 mmol anhydrous bis(acetylacetonate)nickel [referred to as "Ni(acac)$_2$"] and a 114.8 mmol 1,5-cyclooctadiene were dissolved in a 100 ml toluene. Forty ml of a 65.6 mmol triethylaluminum toluene solution were dropped into and reacted with the above solution to synthesize a zero-valent nickel complex, i.e., bis(1,5-cyclooctadiene)nickel [referred to as "Ni(cod)₂"]. This Ni(cod)₂ was recrystallized from toluene.

A 4 mmol Ni(cod)₂ was dissolved in a 30 ml N,N-dimethylformamide, then admixed with 4 mmol of 1,5-cyclooctadiene and 2,2′-bipyridine, and further admixed with a 4 mmol 5,8-dibromoquinoline. The resulting mixture was reacted at a reaction temperature of 60° C. for 24 hours. By this reaction, a reddish-yellow, powdery quinoline-5,8-diyl polymer was obtained. This powdery polymer was isolated by filtering and then, in order to remove impurities such as nickel compounds or the like therefrom, washed several times each with the under-enumerated substances (a)–(f), sequentially in this order.

(a) a 29% ammonia aqueous solution,
(b) methanol,
(c) a sodium ethylenediamine tetraacetate hot aqueous solution, adjusted to pH 3,
(d) a 29% ammonia aqueous solution,
(e) hot water, and
(f) methanol.

After having finished the above washing, the powdery polymer was dried using a vacuum line. Elemental analysis values of the resulting polymer were found to be: 84.3% carbon, 4.0% hydrogen, 10.9% nitrogen and 0.0% bromine and almost agreed with calculated values of a polymer comprising the recurring structural unit represented by the following chemical formula (12)

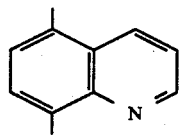

(12)

The calculated values are: 85.0% carbon, 3.9% hydrogen and 11.6% nitrogen. The difference between the found and calculated values seems to be attributable to the difficulty in achieving a complete combustion when performing the elemental analysis of the polymer, mainly due to a high heat-stability of the polymer. In this example, the yield of the polymer was 92%.

The above polymer was soluble in formic acid. Therefore, the molecular weight of the polymer was determined by the light scattering method with regard to a formic acid solution of the polymer. As the result, it was found that the polymer had a weight-average molecular weight of 11,000 corresponding to a degree of polymerization of about 87.

In addition, the infrared absorption spectrum of the above polymer showed the below-described absorptions.

3,028 m, 1,623 m, 1,577 s, 1,498 vs, 1,456 m, 1,375 s, 1,354 m, 1,235 w, 1,197 w, 1,150 m, 1,054 m, 945 vs, 838 s, 788 vs, 679 m, 499 w, 419 w, where the numbers indicate positions of absorption in a cm⁻¹ number, and w, m, s and vs mean weak absorption, medium absorption, strong absorption and very strong absorption, respectively. The above results of the measurements were obtained all in a KBr pellet.

Additionally, the UV to visible region spectrum of a formic acid solution of the above polymer showed relatively sharp, clear and mountain-like maximal absorption peaks in the vicinity of about 345, 320 and 260 nm.

Furthermore, the above polymer exhibited a high heat-stability. As a result of thermogravimetric analyses, a slight weight loss was observed for the first time at about 300° C. Upon heating up to 900° C. in nitrogen, the ignition loss was about 18% by weight.

EXAMPLE 2

A pale yellow, powdery, quinoline-4,7-diyl polymer was obtained in the same manner as Example 1, except that 4,7-dichloroquinoline was used in lieu of 5,8-dibromoquinoline. This powdery polymer was isolated by filtering and then, in order to remove impurities such as nickel compounds or the like therefrom, washed several times each with the under-enumerated substances (a)–(f), sequentially in this order.

(a) a 29% ammonia aqueous solution,
(b) methanol,
(c) a sodium ethylenediamine tetraacetate hot aqueous solution, adjusted to pH 3,
(d) a 29% ammonia aqueous solution,
(e) hot water, and
(f) methanol.

After having finished the above washing, the powdery polymer was dried using a vacuum line. Elemental analysis values of the resulting polymer were found to be: 83.5% carbon, 4.2% hydrogen, 10.9% nitrogen and 0.0% bromine and almost agreed with calculated values (85.0% carbon, 3.9% hydrogen and 11.6% nitrogen) of a polymer comprising the recurring structural unit represented by the following chemical formula (13)

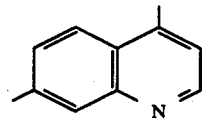

(13)

The difference between the found and calculated values seems to be attributable to the difficulty in achieving a complete combustion when performing the elemental analysis of the polymer, mainly due to a high heat-stability of the polymer. In this example, the yield of the polymer was 98%.

The above polymer was soluble in formic acid and a chloroform solution. Therefore, the molecular weight of the polymer was measured by means of the gel permeation chromatography (GPC) with regard to a chloroform solution of the polymer. As the result, it was found that the polymer had a number-average molecular weight of 7,900 corresponding to a degree of polymerization of about 62.

In addition, the infrared absorption spectrum of the above polymer showed the below-described absorptions.

3,042 m, 1,614 s, 1,577 s, 1,558 s, 1,490 m, 1,450 w, 1,444 m, 1,411 m, 1,373 w, 1,292 w, 1,186 w, 1151 w, 1,057m, 953 w, 892 s, 824 vs, 796 m, 781 s, 683 s, 613 m, 452 w, where the numbers indicate positions of absorption in a cm⁻¹ number, and w, m, s and vs mean weak absorption, medium absorption, strong absorption and very strong absorption, respectively. The above results of the measurements were obtained all in a KBr pellet.

Additionally, the UV to visible region spectrum of a formic acid solution of the above polymer showed relatively sharp, clear and mountain-like maximal absorption peaks in the vicinity of about 340 and 280 nm.

Furthermore, the above polymer exhibited a high heat-stability. As a result of thermogravimetric analyses, a slight weight loss was observed for the first time at about 320° C. Upon heating up to 900° C. in nitrogen, the rate of the ignition loss was about 17% by weight.

EXAMPLE 3

A bright yellow, powdery, quinoline 2,6-diyl polymer was obtained in the same manner as Example 1, except that 2,6-dichloroquinoline was used in lieu of 5,8-dibromoquinoline. This powdery polymer was isolated by filtering and then, in order to remove impurities such as nickel compounds or the like therefrom, washed several times each with the under-enumerated substances (a)–(f), sequentially in this order.
(a) a 29% ammonia aqueous solution,
(b) methanol,
(c) a sodium ethylenediamine tetraacetate hot aqueous solution, adjusted to pH 3,
(d) ammonia water,
(e) hot water, and
(f) methanol.

After having finished the above washing, the powdery polymer was dried using a vacuum line. Elemental analysis values of the resulting polymer were found to be: 84.8% carbon, 4.0% hydrogen, 11.1% nitrogen and 0.0% chlorine and almost agreed with calculated values (85.0% carbon, 3.9% hydrogen and 11.6% nitrogen) of a polymer comprising the recurring structural unit represented by the following chemical formula (14)

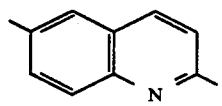
(14)

The difference between the found and calculated values seems to be attributable to the difficulty in achieving a complete combustion when performing the elemental analysis of the polymer, mainly due to a high heat-stability of the polymer. In this example, the yield of the polymer was approximately 100%.

The above polymer was soluble in formic acid. Therefore, the molecular weight of the polymer was determined by the light scattering method with regard to a formic acid solution of the polymer. As the result, it was found that the polymer had a weight-average molecular weight of 15,000 corresponding to a degree of polymerization of about 118.

In addition, the infrared absorption spectrum of the above polymer showed the below-described absorptions.

3,050 m, 1,583 s, 1,548 m, 1,476 s, 1,456 m, 1,355 w, 1,294 w, 1,192 s, 1,130 m, 1,058 s, 882 s, 828 vs, 771 w, 658 m, 481 m, where the numbers indicate positions of absorption in a $cm^{-1}$ number, and w, m, s and vs mean weak absorption, medium absorption, strong absorption and very strong absorption, respectively. The above results of the measurements were obtained all in a KBr pellet.

Additionally, the UV to visible region spectrum of a formic acid solution of the above polymer showed relatively sharp, clear and mountain-like maximal absorption peaks in the vicinity of about 436, and 293 nm.

Furthermore, the above polymer exhibited a high heat-stability. As a result of thermogravimetric analyses, a slight weight loss was observed for the first time at about 170° C. Upon heating up to 900° C. in nitrogen, the ignition loss was about 28% by weight.

EXAMPLE 4

A pale yellow, powdery, isoquinoline-1,4-diyl polymer was obtained in the same manner as Example 1, except that 1,4-dibromoisoquinoline was used in lieu of 5,8-dibromoquinoline. This powdery polymer was isolated by filtering and then, in order to remove impurities such as nickel compounds or the like therefrom, washed several times each with the under-enumerated substances (a)–(f), sequentially in this order.
(a) a 29% ammonia aqueous solution,
(b) methanol,
(c) a sodium ethylenediamine tetraacetate hot aqueous solution, adjusted to pH 3,
(d) a 29% ammonia aqueous solution,
(e) hot water, and
(f) methanol.

After having finished the above washing, the powdery polymer was dried using a vacuum line. Elemental analysis values of the resulting polymer were found to be: 83.5% carbon, 4.0% hydrogen, 10.6% nitrogen and 0.03% bromine and almost agreed with calculated values (85.0% carbon, 3.9% hydrogen and 11.6% nitrogen) of a polymer comprising the recurring structural unit represented by the following chemical formula (15)

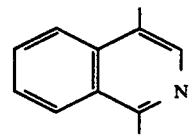
(15)

The difference between the found and calculated values seems to be attributable to the difficulty in achieving a complete combustion when performing the elemental analysis of the polymer, mainly due to a high heat stability of the polymer. The bromine content in the found values is conjectured to be attributable to unreacted terminal groups of the polymers as shown in the following chemical formula (16):

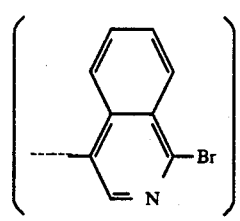
(16)

In this example, the yield of the polymer was 95%.

The above polymer was soluble in formic acid and chloroform. Therefore, the molecular weight of the polymer was determined by means of the GPC or light scattering method with regard to a chloroform solution and a formic acid solution of the polymer, respectively. It was found that as the result of the GPC, the polymer had a number-average molecular weight of 2,600 corresponding to a degree of polymerization of about 21, while as the result of the light scattering method, the polymer had a weight-average molecular weight of 2,000 corresponding to a degree of polymerization of about 16.

In addition, the infrared absorption spectrum of the above polymer showed the below-described absorptions.

3,042 m, 1,613 s, 1,570 m, 1,539 s, 1,501 vs, 1,450 w, 1,368 m, 1,333 m, 1,287 m, 1,253 m, 1,161 m, 1143 m, 1,022 w, 965 vs, 915 m, 870 w, 796 m, 761 vs, 629 s, 461 w, 429 w, where the numbers indicate positions of absorption in a $cm^{-1}$ number, and w, m, s and vs mean weak absorption, medium absorption, strong absorption and very strong absorption, respectively. The above results of the measurements were obtained all in a KBr pellet.

Additionally, the UV to visible region spectrum of a formic acid solution of the above polymer showed relatively sharp, clear and mountain-like maximal absorption peaks in the vicinity of about 370 and 260 nm.

Furthermore, the above polymer exhibited a high heat-stability. As a result of thermogravimetric analyses, a slight weight loss was observed for the first time at about 300° C. Upon heating up to 900° C. in nitrogen, the rate of the ignition loss was about 17% by weight.

EXAMPLE 5

A 0.3 mmol 1,4-dibromoisoquinoline, a 0.15 mmol tris(2,2'-bipyridine)nickel salt [Ni(bpy)$_3$Br$_2$] and a 3.75 mmol tetraethylammonium perchlorate [(C$_2$H$_5$)$_4$NClO$_4$)] were dissolved in a 15 ml N,N-dimethylformamide to prepare an electrolyte. This electrolyte was introduced into an electrolytic cell equipped with platinum plates (1 cm × 1 cm = 2 cm$^2$) as a cathode and an anode and a silver electrode as a reference electrode. Then, an electrolytic polymerization reaction was conducted for 16 hours at a polymerization temperature of 60° C. and an electrolytic potential of −1.7V (a potential vs Ag/Ag+, the same applies hereinafter) and a yellow, filmy polymer (isoquinoline-1,4-diyl polymer) was produced on the cathode. This filmy polymer was collected and then, in order to remove impurities such as nickel compounds or the like therefrom, washed several times each with the under-enumerated substances (a)-(f), sequentially in this order.

(a) a 29% ammonia aqueous solution,
(b) methanol,
(c) a sodium ethylenediamine tetraacetate hot aqueous solution, adjusted to pH 3,
(d) a 29% ammonia aqueous solution,
(e) hot water, and
(f) methanol.

After having finished the above washing, the filmy polymer was dried using a vacuum line. This polymer showed the below-described absorptions in the infrared absorption spectrum thereof.

3,048 m, 1,614 s, 1,571 m, 1,543 s, 1,504 vs, 1,449 w, 1,372 m, 1,333 m, 1,283 m, 1,254 m, 1,161 m, 1144 m, 1,024 w, 965 vs, 914 m, 870 w, 796 m, 763 vs, 629 s, 462 w, 425 w, where the numbers indicate positions of absorption in a $cm^{-1}$ number, and w, m, s and vs mean weak absorption, medium absorption, strong absorption and very strong absorption, respectively. The above results of the measurements were obtained all in a KBr pellet.

Additionally, the UV to visible region spectrum of a formic acid solution of the above polymer showed relatively sharp, clear and mountain-like maximal absorption peaks in the vicinity of about 370 and 260 nm.

These spectrum data show that the obtained yellow filmy polymer is the same as the polymer obtained in Example 4 that has a recurring structural unit as shown in the chemical formula (15).

EXAMPLE 6

Degrees of depolarization of formic acid solutions respectively of the quinoline-5,8-diyl polymer obtained in Example 1 and quinoline-4,7-diyl polymer obtained in Example 2 were determined by means of the light scattering method using a laser beam. In the degree of depolarization $\rho$, the $\rho_v$ value is related with a polarizability ($\alpha_1$) in the direction of the longitudinal axis of the polymer and a polarizability ($\alpha_2$) in the direction of the lateral axis of the polymer, according to the following formulae (17) and (18):

$$\rho_v = \frac{3\delta^2}{5 + 4\delta^2} \quad (17)$$

$$\delta^2 = \left(\frac{\alpha_1 - \alpha_2}{\alpha_1 + 2\alpha_2}\right)^2 \quad (18)$$

Therefore, in the condition of $\alpha_1 > \alpha_2$, $\delta^2 = 1$ and $\rho_v = \frac{1}{3}$.

The quinoline-5,8-diyl polymer obtained in Example 1 and quinoline-4,7-diyl polymer obtained in Example 2 showed $\rho_v$ values of at least 0.33 and at most of 0.01, respectively. Thus, the fact that the quinoline-5,8-diyl polymer has a very large $\rho_v$ value demonstrates a very large polarizability ($\alpha_1$) along the main polymer chain and thus suggests that the polymer takes a rod-like, linear structure. In contrast, the fact that the quinoline-4,7-diyl polymer has a very small $\rho_v$ value demonstrates substantially no difference exist between the polarizability ($\alpha_1$) in the direction of the longitudinal axis and a polarizability ($\alpha_2$) in the direction of the lateral axis of the polymer and thus suggests that the polymer takes a random coil structure. Additionally, all the $\rho_v$ values were determined with a formic acid solution of the polymer.

EXAMPLE 7

A chloroform solution of the isoquinoline-1,4-diyl polymer obtained in Example 4 was spread over a platinum plate and chloroform was removed by evaporation to provide a polymer film. A cyclic voltammogram of this polymer film was determined in an acetonitrile solution containing (C$_2$H$_5$)$_4$NClO$_4$ in an amount of 0.1 mol/l. As a result, it was found that this polymer could be doped at about −2.1V vs Ag/Ag+ and undoped at about −2.0V (potential vs Ag/Ag+ ) by a reverse sweep. During doping, the color changed from pale yellow to reddish purple, while during undoping the color changed reversely. Such electrochemical behaviors and color changing phenomena indicate that the polymer of the present invention is electrochemically active and suited for use as components of cells such as electrodes for batteries as well as materials exhibiting electrochromism.

The doping and undoping potentials obtained by the isoquinoline-1,4-diyl polymer of the present invention were substantially on the same level as those obtained by polypyridine-2,5-diyl. Since the polypyridine-2,5-diyl is a typical compound n-type dopable at this potential and has a π-conjugation system basically analogous to that of the polymers of the present invention, it is assumed that n-type doping is performed also in the above electrochemical doping.

Further, when the isoquinoline-1,4-diyl polymer according to the present invention was soaked in a solution containing sodium naphthalide (a reaction product of naphthalene and sodium), the same color change from pale yellow to purple or reddish purple as in the case of electrochemical doping was observed. It was found that a solid material obtained by compression molding a sodium ion adduct of the produced isoquinoline-1,4-diyl polymer under pressure was a semiconductor having an electroconductivity of $1.8 \times 10^{-3} \text{Scm}^{-1}$ (siemens·cm$^{-1}$) at room temperature. Sodium naphthalide is a typical compound to dope high polymers of $\pi$-conjugation system into n-type conductors, so that it is assumed that n-type doping is performed the same as the above-described electrochemical doping.

Since they ar resistant to heat and soluble in organic solvents, the (iso)quinolinediyl polymers according to the present invention can be shaped into fibers, films or the like, according to a dry process by making use of solutions obtained by dissolving in an appropriate organic solvent which is evaporated after shaping. Besides, the polymers of the invention have excellent characteristics such that the degree of depolarization and electrochemical oxidation-reduction potential are controllable according to the polymer structure, etc. which have not been realized by conventional polyarylenes.

Alternatively, according to the process of the present invention, bond positions of monomers can be exactly decided, since these correspond to the location of bonded eliminating groups i.e. halogen groups. Therefore, various (iso)quinolinediyl polymers differing in bond position can be arbitrarily synthesized. Namely, FIG. 1 shows the IR spectra of polymers (a), (b), (c) and (d) manufactured from 5,8-dibromooquinoline, 4,7-dichloroquinoline, 1,4-dibromoisoquinoline and 5,8-dibromoisoquinoline, respectively, in accordance with the process of Example 1 described above. In all these spectra, though absorptions characteristic of condensed heterocyclic rings, i.e., an (iso)quinoline rings, are recognized, the absorption peaks based on C-H out-of-plane deformation vibration and stretching vibration differ little by little. These peaks well agree with the spectrum of each monomer.

Additionally, the obtained polymers are all soluble in formic acid, chloroform or the like, and the peaks characteristic of the protons of the (iso)quinoline rings are observed over 7-10 ppm in the $^1$H-NMR spectrum of each polymer. Alternatively, also in the $^{13}$C-NMR spectrum, the peaks characteristic of the aromatic carbons of the (iso)quinoline rings are observed over 120-160 ppm. FIG. 2 shows the $^{13}$C-NMR spectrum of the quinoline-4,7-diyl polymer. From these results, it is understood that (iso)quinolinediyl polymers whose bond positions have been controlled can be obtained.

What is claimed is:

1. A process for preparing an (iso)quinolinediyl polymer comprising, as a recurring structural unit, a divalent group represented by the following chemical formula (1) or (2):

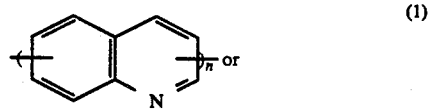

wherein n is an integer of at least 5, which process comprises reacting an (iso)quinoline dihalide represented by the following general formula (3) or (4):

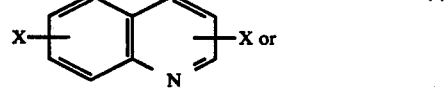

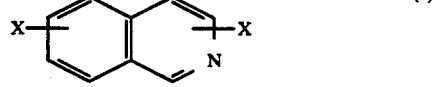

wherein X represents a halogen atom, with a zero-valent nickel compound.

2. A process for preparing an (iso)quinolinediyl polymer comprising, as a recurring structural unit, a divalent group represented by the following chemical formula (1) or (2):

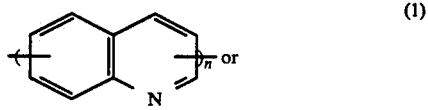

wherein n is an integer of at least 5, which process comprises electrolytically reducing an (iso)quinoline dihalide represented by the following general formula (3) or (4):

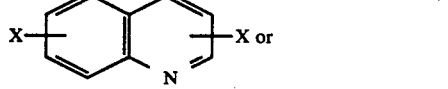

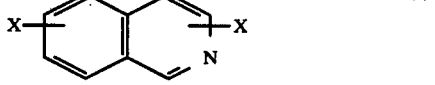

wherein X represents a halogen atom, in the presence of a nickel compound.

* * * * *